US009787047B2

(12) United States Patent
Mori

(10) Patent No.: US 9,787,047 B2
(45) Date of Patent: Oct. 10, 2017

(54) SENSOR AND METHOD OF PRODUCING THE SAME

(71) Applicant: NGK SPARK PLUG CO., LTD., Nagoya-shi, Aichi-ken (JP)

(72) Inventor: Akio Mori, Kounan (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 288 days.

(21) Appl. No.: 14/705,833

(22) Filed: May 6, 2015

(65) Prior Publication Data

US 2015/0323392 A1    Nov. 12, 2015

(30) Foreign Application Priority Data

May 12, 2014  (JP) ................................. 2014-098525
Apr. 8, 2015   (JP) ................................. 2015-079151

(51) Int. Cl.
*G01K 7/02*       (2006.01)
*H01R 43/28*   (2006.01)
(Continued)

(52) U.S. Cl.
CPC ............. *H01R 43/28* (2013.01); *B23K 31/02* (2013.01); *G01K 7/02* (2013.01); *G01K 7/22* (2013.01);
(Continued)

(58) Field of Classification Search
CPC  G01K 7/02; G01K 7/22; G01K 13/02; G01K 2205/04; G01K 2013/024;
(Continued)

(56) References Cited

U.S. PATENT DOCUMENTS 6,286,995 B1 *  9/2001  Takahashi .............. G01K 13/02
                                                          374/148
6,305,841 B1 * 10/2001  Fukaya .................... G01K 7/22
                                                          374/185
(Continued)

FOREIGN PATENT DOCUMENTS

JP      H05-300688 A     11/1993
JP      H07-140012 A      6/1995
JP      2013-68610 A      4/2013

*Primary Examiner* — Manish S Shah
(74) *Attorney, Agent, or Firm* — Stites & Harbison, PLLC; Jeffrey A. Haeberlin

(57) ABSTRACT

A sensor includes a sensor element and a conductive wire. The sensing element includes a sensing portion and a terminal wire extending from the sensing portion. The sensing portion has an electrical characteristic that changes in accordance with a change in an atmosphere. The conductive wire is for communicating an electrical signal from the sensor element. The conductive wire includes a plurality of conductors twisted together. The terminal wire and the conductive wire are arranged in a longitudinal direction of the sensor and are connected to each other by welding. The conductive wire includes a first weld portion formed by integrating the plurality of conductors in the longitudinal direction by welding. The terminal wire and the conductive wire are connected to each other through a second weld portion, and the second weld portion is formed only in a region longitudinally overlapping the first weld portion.

5 Claims, 10 Drawing Sheets

(51) Int. Cl.
*G01K 7/22* (2006.01)
*G01K 13/02* (2006.01)
*B23K 31/02* (2006.01)
*H01R 4/02* (2006.01)

(52) U.S. Cl.
CPC ............. *G01K 13/02* (2013.01); *H01R 4/023* (2013.01); *H01R 4/029* (2013.01); *G01K 2013/024* (2013.01); *G01K 2205/04* (2013.01)

(58) Field of Classification Search
CPC ........ H01R 4/023; H01R 4/029; H01R 43/28; B23K 31/02
See application file for complete search history.

(56) References Cited

U.S. PATENT DOCUMENTS

| | | | | |
|---|---|---|---|---|
| 8,864,375 | B2* | 10/2014 | Abe | G01K 1/08 374/144 |
| 2002/0039378 | A1* | 4/2002 | Shibayama | G01K 13/02 374/148 |
| 2009/0323765 | A1* | 12/2009 | Yokoi | G01K 1/08 374/185 |
| 2011/0228812 | A1* | 9/2011 | Suzuki | B23K 26/127 374/163 |
| 2012/0039362 | A1* | 2/2012 | Pedersen | G01K 1/08 374/208 |
| 2013/0064266 | A1* | 3/2013 | Mori | G01K 13/02 374/165 |

\* cited by examiner

SENSOR AND METHOD OF PRODUCING THE SAME

CROSS REFERENCE TO RELATED APPLICATIONS

The present application claims priority from Japanese Patent Application No. 2014-098525, which was filed on May 12, 2014, the disclosure of which is herein incorporated by reference in its entirety.

BACKGROUND OF THE INVENTION

Field of the Invention

The present invention relates to a sensor in which terminal wires extending from, for example, a temperature-sensitive portion of a temperature sensitive element are joined by welding to conductive wires (e.g., lead wires) each formed of a plurality of conductors and to a method of producing the sensor. Particularly, the present invention relates to a sensor, such as a vehicle-mounted temperature sensor or a high temperature sensor used for exhaust gas measurement in a general-purpose stationary engine etc., which can be preferably used even under use conditions under which vibrations are applied to the main body of the sensor, the peripheries of its lead wires, etc. The present invention also relates to a method of producing this sensor.

Description of Related Art

Temperature sensors have been used to measure the temperature of, for example, exhaust gas from engines, and temperature sensors having various structures have been proposed.

For example, Patent Document 1 discloses a technique for solder-joining a terminal wire extending from a thermistor element covered with an insulator to a plurality of conductors protruding from an end of an insulator-coated wire. Patent Document 2 discloses a technique for joining each of terminal wires extending from a thermistor element through insulator tubes and to a plurality of conductors forming a lead wire by welding within a temperature sensor on its rear end side.

A problem arises when a terminal wire is joined to a plurality of conductors of a lead wire by resistance welding, in that it is not easy to control the welding current. Specifically, when the lead wire is formed of a plurality of small-diameter conductors, the conductors may melt and break during welding if the welding current is large. When the welding current is set to be low to prevent this problem, welding fails to be performed completely, so that the welded portions may be separated from each other.

In order to weld a plurality of loose conductors to one plate-shaped or rod-shaped terminal wire in a reliable manner, welding must be repeated about 4 to 5 times, and, disadvantageously, the welding operation requires much time and effort.

In view of the above, there has been developed a technique for integrally joining a terminal wire to a conductive wire composed of a plurality of conductors, which are twisted together, in an easy and reliable manner (see Patent Document 3). Specifically, the plurality of conductors are fusion-bonded and integrated in advance by first welding, and then the conductive wire composed of the plurality of (integrated) conductors is welded to the terminal wire (second welding).

With this technique, the terminal wire is connected by the second welding to the conductive wire composed of the plurality of small-diameter conductors that have been integrated by the first welding so as to be substantially thickened as compared to the individual conductors. Therefore, the welding current in the second welding can be appropriately set.

RELATED ART DOCUMENTS

Patent Document 1 is Japanese Patent Application Laid-Open (kokai) No. H05-300688.
Patent Document 2 is Japanese Patent Application Laid-Open (kokai) No. H07-140012.
Patent Document 3 is Japanese Patent Application Laid-Open (kokai) No. 2013-68610 (FIG. 11).

BRIEF SUMMARY OF THE INVENTION

In the technique described in Patent Document 3, the second welding is performed with the terminal wire placed on the plurality of conductors including a flattened welded portion formed by fusion-bonding the conductors in the first welding. However, as shown in Patent Document 3 (FIG. 11), the above-described welded portion is formed only in a region with a short axial length. The conductive wire is not flattened in portions other than the welded portion, and the conductors are not integrated in these portions. Therefore, when a terminal wire is placed on a portion of the conductors other than the welded portion and then pressed, the conductors may loosen or deform and therefore may fail to come into stable contact with the terminal wire. In this case, when the second welding is performed in this portion, a welding failure may occur. In addition, in the case where the second welding is performed with a circular rod-shaped terminal wire placed on the round twisted wires, the terminal wire may slip off the initial placement position. In such a case, the second welding may fail to be performed at the desired position.

Accordingly, an object of the present invention is to provide a sensor in which, when a plurality of conductors forming a conductive wire are fusion-bonded and integrated in advance and then welded to a terminal wire, the terminal wire and the conductive wire can be welded and integrated in a more easy and reliable manner. Another object of the present invention is to provide a method of producing the sensor.

In order to achieve the above-described object, a sensor of the present invention comprises a sensor element including a sensing portion and a terminal wire extending from the sensing portion. The sensing portion has an electrical characteristic (i.e., electric property) that changes in accordance with a change in an atmosphere around the sensing portion. The sensor also comprises a conductive wire for communicating (i.e., obtaining) an electrical signal from the sensor element, the conductive wire including (i.e., being composed of) a plurality of conductors twisted together. The terminal wire and the conductive wire are arranged in a longitudinal (i.e., axial) direction of the sensor and are connected to each other by welding. The sensor is characterized in that a portion of the conductive wire extending in the longitudinal direction is welded to integrate the plurality of conductors therein and to form a first weld portion, and the terminal wire and the conductive wire are connected to each other through a second weld portion, the second weld portion formed only in a region longitudinally overlapping the first weld portion.

In this sensor, as a result of the first welding, the plurality of conductors forming the conductive wire are fusion-bonded and integrated into a flattened shape. Then, the terminal wire is placed on the flattened conductors such that they overlap each other. In this case, since the second welding is performed only in the region axially overlapping the first weld portion, the second welding is performed in the first weld portion which has a stable shape and in which the conductors are reliably welded and integrated, so that the occurrence of welding failure caused by, for example, displacement of the welding portion due to loosening or deformation of the conductors can be suppressed. Therefore, the conductive wire and the terminal wire can be connected more easily and reliably than in the conventional art.

As a result of the first welding, the plurality of fine conductors are integrated, and the terminal wire is welded to the substantially thickened conductive wire (as compared to the individual conductors) by the second welding. Therefore, the welding current in the second welding can be set appropriately. Specifically, a welding current suitable for the thick conductive wire (composed of the plurality of conductors) can be set. In this manner, blowout of the conductors during welding (due to an excessively high welding current) can be prevented, and separation of the welded portions (due to an excessively low welding current) can also be prevented.

The first weld portion may be formed by continuously integrating the plurality of conductors from their ends in the longitudinal (axial) direction, and the longitudinal (axial) length of the first weld portion may be equal to or more than ½ of the length LB of portions of the plurality of conductors projecting from an insulating cover layer covering the plurality of conductors.

In this sensor, the first weld portion may be formed by continuously integrating the plurality of conductors from their ends in the axial direction, and therefore the forward end portion of the conductors is flattened. In addition, the axial length of the first weld portion increases, and the first weld portion has a sufficient length for the second welding, so that the terminal wire can be reliably disposed on the flattened first weld portion. Therefore, the second welding can be performed at the desired position in a reliable manner. In particular, in the case where the terminal wire has the shape of a circular rod, the terminal wire easily comes off the first weld portion. Therefore, the first weld portion is formed by continuously integrating the plurality of conductors in the axial direction, whereby the terminal wire can be disposed on the first weld portion more reliably.

The maximum width of the terminal wire may be smaller than the maximum width of the first weld portion.

When the maximum width of the terminal wire is larger than the maximum width of the first weld portion, the conductors may easily loosen or deform in a portion other than the first weld portion and change their shape. In this case, the terminal wire may slip and come off the conductors at this portion, and a welding failure may occur more easily in the second welding. Therefore, the present invention is more effective when the maximum width of the terminal wire is smaller than the maximum width of the first weld portion.

A sensor production method of the present invention is a method of producing a sensor including a sensor element with a sensing portion and a terminal wire extending from the sensing portion. The sensing portion has an electrical characteristic (i.e., electric property) that changes in accordance with a change in an atmosphere around the sensing portion. The sensor also includes a conductive wire for communicating (i.e., obtaining) an electrical signal from the sensor element, the conductive wire including (i.e., being formed from) a plurality of conductors twisted together. The terminal wire and the conductive wire are arranged in a longitudinal (i.e., axial) direction of the sensor and are connected to each other by welding. The method comprises: a first step of melting, by a first welding, a portion (i.e., part) of the conductive wire in the longitudinal direction to integrate the plurality of conductors therein and to form a first weld portion; and a second step of placing the terminal wire on the conductive wire such that the terminal wire and the conductive wire overlap each other in the longitudinal (i.e., axial) direction to form an overlapping region extending over at least part of the first weld portion, and then forming a second weld portion by second welding the terminal wire to the conductive wire only in a region overlapping the first weld portion and within the overlapping region (to thereby connect the terminal wire and the conductive wire to each other).

In the method of producing a sensor, as a result of the first welding, the plurality of conductors forming the conductive wire are fusion-bonded and integrated into a flattened shape, and the terminal wire is placed on the integrated conductors such that they overlap each other. Then, the second welding is performed only in the region overlapping the first weld portion within the axially overlapping region. Specifically, the second welding is performed in the first weld portion in which the conductors are reliably welded and integrated and their shape is stabilized, so that the occurrence of welding failure caused by, for example, displacement of the welding portion due to loosening or deformation of the conductors can be suppressed. Therefore, the conductive wire and the terminal wire can be connected more easily and reliably than in the conventional art.

The first step may be performed in such a manner that the plurality of conductors are placed in a groove of a guide member, the groove having a prescribed width, and the first weld portion is formed while the conductors are restrained from spreading in the width direction thereof.

In the method of producing a sensor, the groove can restrain the conductors from loosening or spreading excessively when the conductors are pressed and causes the first weld portion to have a constant width close to the width of the groove, so that the first weld portion obtained has a uniform shape. Therefore, the terminal wire can be stably placed on the first weld portion, and the second welding can be performed in an easy and reliable manner.

The second step may be performed in a state in which the overlapping region is formed by placing the terminal wire on the plurality of conductors disposed in the groove of the guide member.

In the method of producing a sensor, the second weld portion can be formed while the groove serving as a guide restrains the terminal wire from coming off the conductive wire.

According to the present invention, when the plurality of conductors forming the conductive wire are fusion-bonded and integrated in advance and then welded to the terminal wire, the terminal wire and the conductive wire can be welded and integrated in a more easy and reliable manner.

DETAILED DESCRIPTION OF EXEMPLARY EMBODIMENTS OF THE INVENTION

An embodiment of the present invention will next be described.

In the embodiment, a temperature sensor that is to be attached to an exhaust manifold of an automobile engine to measure the temperature of exhaust gas will be described as an exemplary sensor.

(a) First, the configuration of the temperature sensor of the present embodiment will be described.

Figure 1:
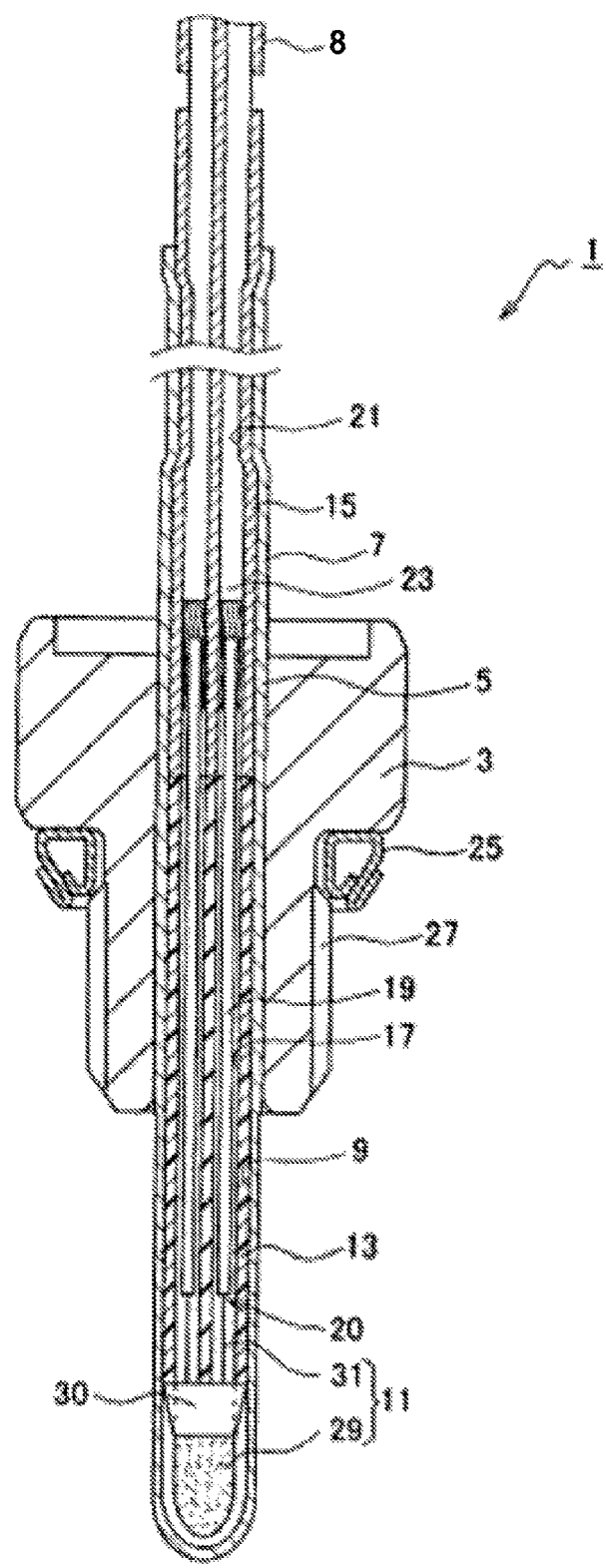
FIG. 1 is a cross-sectional view showing a temperature sensor according to an embodiment of the present invention, the temperature sensor being cut in its axial direction.

As shown in FIG. 1, the temperature sensor 1 of the present embodiment includes a mounting metal member 3 for mounting the temperature sensor 1 itself to an exhaust manifold (not shown); a metal pipe 7 inserted into a center hole 5 formed in the axial center of the mounting metal member 3; a temperature sensor element 11 disposed at the forward end (the lower end in FIG. 1) of an inner bore 9 of the metal pipe 7; an insulator tube 13 disposed rearward (upward in FIG. 1) of the temperature sensor element 11; an auxiliary ring 15 disposed rearward of the insulator tube 13; a pair of junction wires 19 disposed in a pair of through holes 17 in the insulator tube 13; and a pair of lead wires 23 disposed in a pair of through holes 21 in the auxiliary ring 15. These components will next be described.

The mounting metal member 3 is a fastening nut formed of, for example, S10C, and the center hole 5 is formed in the axial center thereof. An annular gasket 25 formed of, for example, copper is disposed outward of a central portion of the mounting metal member 3, and a threaded portion 27 for fixing the mounting metal member 3 to the exhaust manifold is provided on the outer circumferential surface of the mounting metal member 3 in a region forward of the gasket 25.

The metal pipe 7 is an elongated cylindrical tubular member with a closed end (e.g., outer diameter $\phi$4.1 mm×inner diameter $\phi$3.5 mm×length 40 mm) formed of, for example, SUS304L. The metal pipe 7 is press-fitted into the center hole 5 of the mounting metal member 3 and fixed thereto. The forward end of the metal pipe 7 is closed, and has a hemispherical shape. The forward end of the metal pipe 7 protrudes from the forward end of the mounting metal member 3, and the rear end of the metal pipe 7 protrudes from the rear end of the mounting metal member 3.

The temperature sensor element 11 includes a temperature-sensitive portion 29, which is a thermistor sintered body, and a pair of electrode wires (Dumet wires) 31 formed from, for example, Ni wires and protruding from the temperature-sensitive portion 29. The rear end of the temperature-sensitive portion 29 is joined and fixed to the forward end of the insulator tube 13 through cement 30.

The insulator tube 13 is an electrically insulating member formed of, for example, KP-85 and has the pair of through holes 17 extending in an axial direction so as to accommodate the pair of electrode wires 31 of the temperature sensor element 11.

The junction wires 19 are each, for example, a strip-shaped plate member (e.g., length 23.5 mm×width 0.65 mm×thickness 0.5 mm) formed of SUS304 and are inserted into the through holes 17 of the insulator tube 13. The forward ends of the pair of junction wires 19 are joined by resistance welding to the rear ends of the pair of electrode wires 31 of the temperature sensor element 11. The rear ends of the pair of junction wires 19 protrude from the insulator tube 13.

The temperature sensor element 11 corresponds to the "sensor element" in the claims. The temperature-sensitive portion 29 corresponds to the "sensing portion" in the claims.

Each of the pairs of the electrode wires 31 and junction wires 19 (that are integrally joined) corresponds to the "terminal wire (20)" in the claims. In a mode in which the junction wires 19 are not present, each of the electrode wires 31 corresponds to the "terminal wire (20)" in the claims.

The auxiliary ring 15 is an electrically insulating seal member formed of, for example, silicon rubber and has the pair of through holes 21 extending in the axial direction so as to accommodate the pair of lead wires 23. The forward end of the auxiliary ring 15 abuts against the rear end of the insulator tube 13, and the rear end of the auxiliary ring 15 protrudes from the metal pipe 7.

Figure 2:
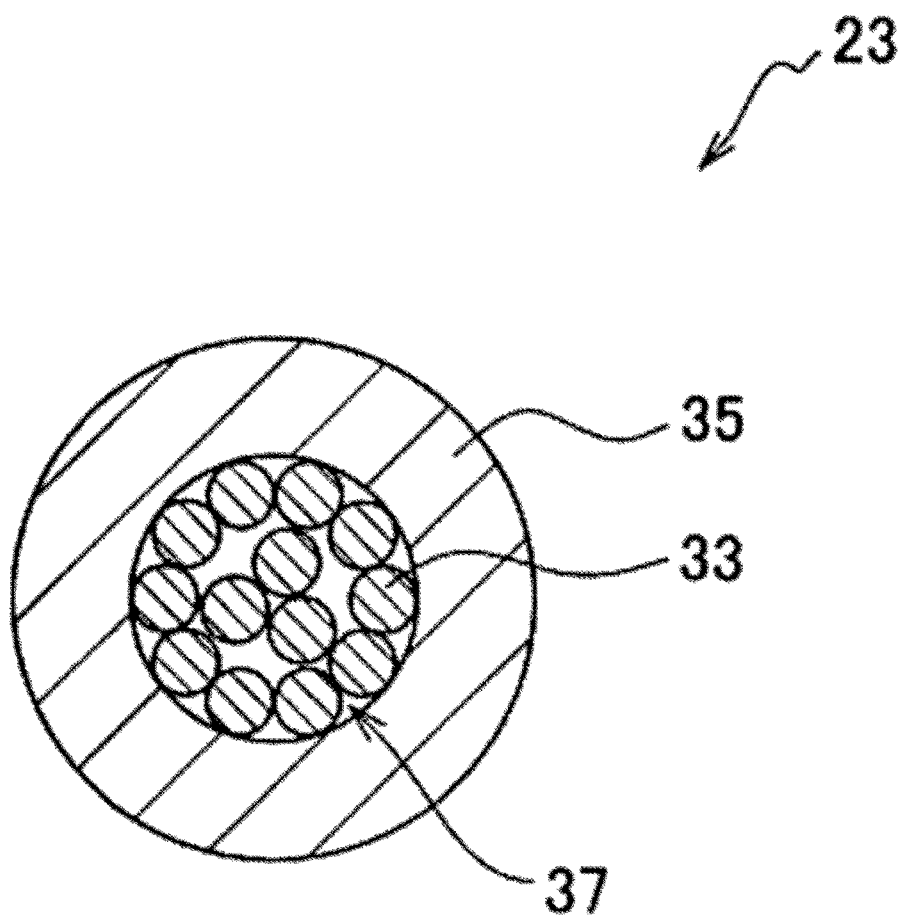
FIG. 2 is a cross-sectional view showing a lead wire of the temperature sensor, the lead wire being cut perpendicularly to its axial direction.

As shown in FIG. 2, each of the lead wires 23 has a configuration in which a plurality of small-diameter conductors 33 are bundled (for example, a configuration in which 12 conductors 33 having a diameter of 1.4 mm are bundled and twisted together), and the outer side of each lead wire 23 is covered with an insulating cover layer 35 formed of, for example, PFA. In the following description, the entire conductive portion formed of a bundle of conductors 33 is referred to as a conductive wire 37.

As shown in FIG. 1, portions of the paired lead wires 23 located rearward of the auxiliary ring 15 are accommodated in a protective tube 8 formed of braided glass fibers impregnated with silicon varnish.

Figure 3:
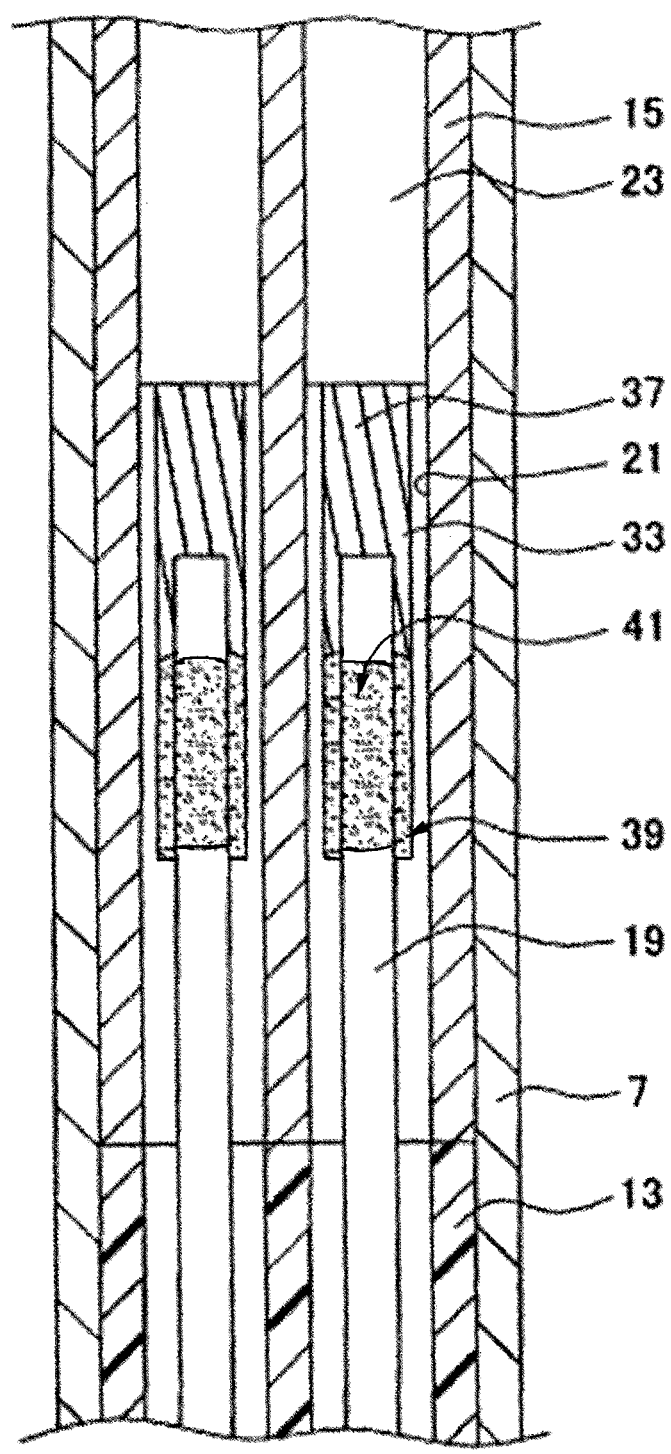
FIG. 3 is an enlarged cross-sectional view of the temperature sensor cut in the axial direction, the cross-sectional view showing joint portions between lead wires and junction wires being enlarged.

Particularly, in the present embodiment, as shown in FIG. 3 with a main portion enlarged, the forward ends of the conductors 33 forming the conductive wires 37 of the pair of lead wires 23 within the pair of through holes 21 of the auxiliary ring 15 are fusion-bonded integrally by first weld portions 39 formed by first resistance welding.

The pair of junction wires 19 protruding from the rear end of the insulator tube 13 are connected to the conductive wires 37 of the lead wires 23 within the pair of through holes 21 of the auxiliary ring 15 through second weld portions 41 formed by second resistance welding.

(b) Next, a method of producing the temperature sensor 1 of the present embodiment will be described.

Figure 4:
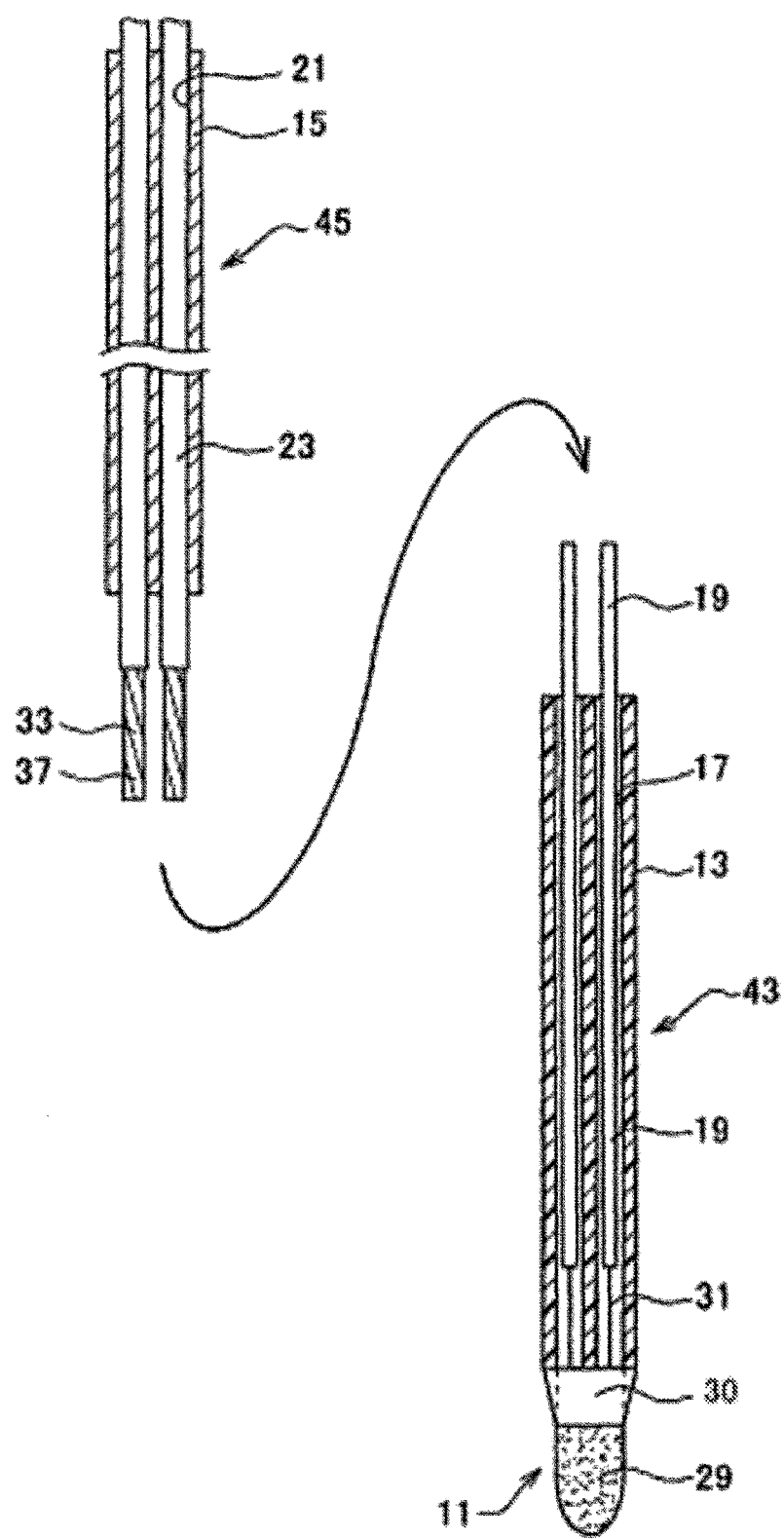
FIG. 4 are cross-sectional views of an inner forward end portion and an inner rear end portion cut in the axial direction, the cross-sectional views showing the state before the inner forward end portion and the inner rear end portion are combined in a method of producing the temperature sensor according to the embodiment of the present invention.

As shown in FIG. 4, first, an inner forward end structure (an inner forward end portion 43) of the temperature sensor 1 is produced. Specifically, junction wires 19 are joined to the rear ends of the electrode wires 31 of the temperature sensor element 11 by well-known resistance welding. Next, the junction wires 19 are inserted into the through holes 17 of the insulator tube 13, and then the upper section (the upper section in FIG. 4) of the temperature-sensitive portion 29 of the temperature sensor element 11 is joined to the lower end (the lower portion in FIG. 4) of the insulator tube 13 through the cement 30.

An inner rear end structure (an inner rear end portion 45) of the temperature sensor 1 is produced by inserting the lead wires 23 into the through holes 21 of the auxiliary ring 15. In this case, for operations such as the first resistance welding and the second resistance welding described later, the auxiliary ring 15 is displaced (upward in FIG. 4) such that the lead wires 23 protrude from the forward end of the auxiliary ring 15.

Figure 5A:
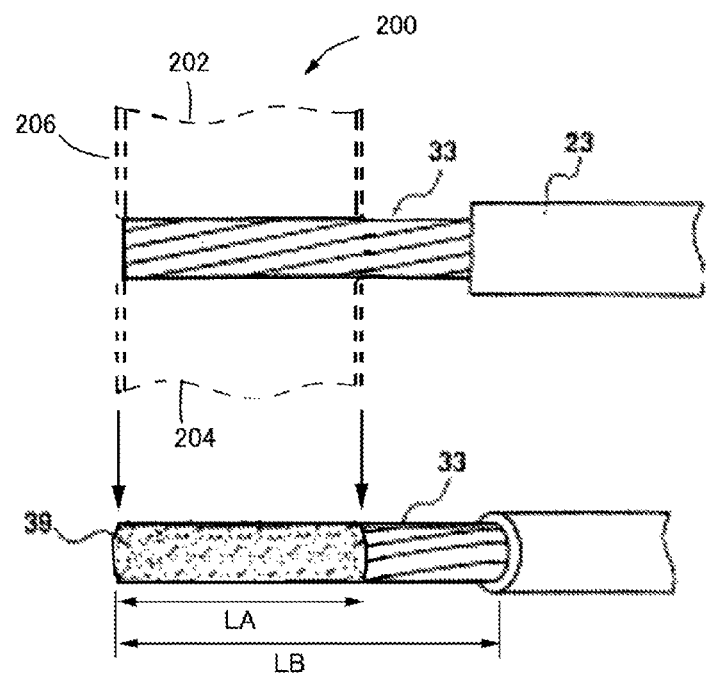
FIG. 5(a) are explanatory views schematically showing first resistance welding and a first weld portion.
Figure 5B:
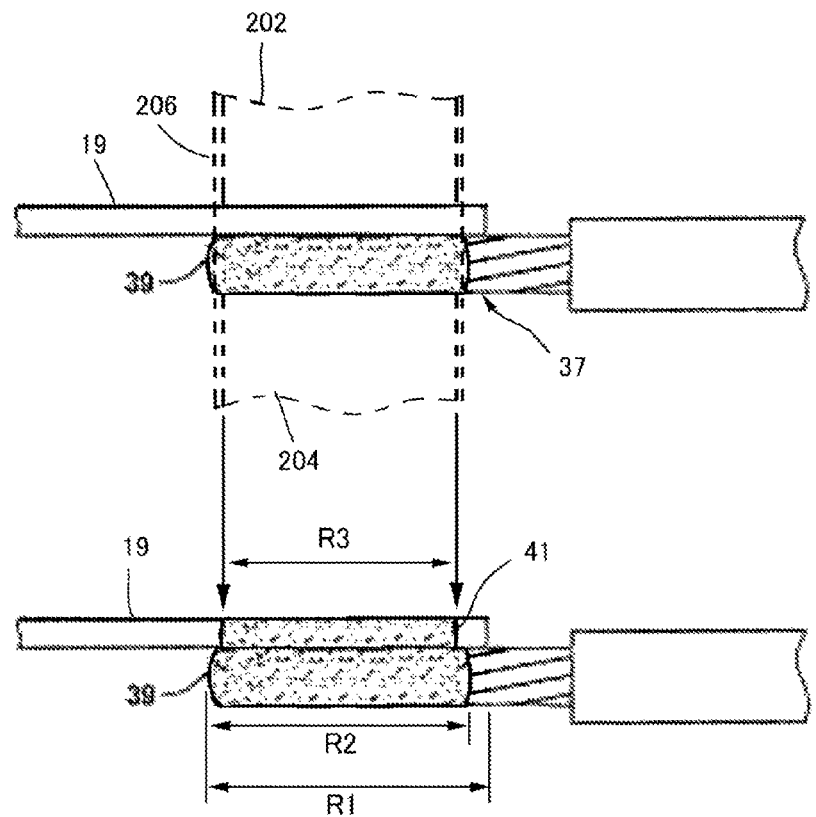
FIG. 5(b) are explanatory views schematically showing second resistance welding and the state after the second resistance welding.

Next, as shown in FIGS. 5(a) and 5(b), by the first resistance welding, conductors 33 are fusion-bonded and integrated together to have a flattened shape. Specifically, as shown in the drawing on the upper side of FIG. 5(a), a pair of jigs (welding electrodes) 202 and 204 used for the first resistance welding are disposed so as to sandwich the forward ends of the conductors 33 of a lead wire 23. Then, electric current is applied between the welding electrodes 202 and 204 to generate Joule heat to thereby melt the conductors 33, whereby well-known resistance welding is performed.

The first resistance welding corresponds to the "first welding" in the claims.

As a result of the first resistance welding, the conductors 33 are fusion-bonded continuously in the axial direction and integrated as shown in the drawing on the lower side of FIG. 5(a) to thereby form a first weld portion 39. The step in FIG. 5(a) corresponds to the "first step" in the claims.

When the conductors 33 held between the welding electrodes 202 and 204 are pressed and welded, the conductors 33 are flattened, and the first weld portion 39 formed may extend slightly beyond the axial length of the welding electrodes 202 and 204, as shown in the drawing on the lower side of FIG. 5(a).

In the present embodiment, a welding apparatus 200 includes the welding electrodes 202 and 204 and a guide member 206, and the first resistance welding is performed with the conductors 33 placed in a groove of the guide member 206. The guide member 206 will be described later.

Next, as shown in FIG. 5(b), the conductive wire 37 is connected to a junction wire 19 by the second resistance welding. Specifically, as shown in the drawing on the upper side of FIG. 5(b), the junction wire 19 and the conductive wire 37 of the lead wire 23 are disposed so as to overlap each other. More specifically, they are disposed such that the axial directions of the junction wire 19 and the conductive wire 37 coincide with each other, and the junction wire 19 overlaps the conductive wire 37 in a region extending over at least part of the first weld portion 39 and beyond the rear end (the right end in the drawing on the upper side of FIG. 5(b)) of the first weld portion 39. The overlapping region R1 of the conductive wire 37 and the junction wire 19 is shown in the drawing on the lower side of FIG. 5(b).

Subsequently, the welding electrodes 202 and 204 used for the second resistance welding (these are similar to the electrodes used for the first resistance welding) are disposed in the region of the first weld portion 39 (a region R2 in the drawing on the lower side of FIG. 5(b)), which is located within the overlapping region R1 in the axial direction, so as to sandwich the conductive wire 37 and the junction wire 19. Then, electric current is applied between the welding electrodes 202 and 204 to generate Joule heat to thereby melt the conductors 33 and the junction wire 19, whereby well-known resistance welding is performed.

As a result of the second resistance welding of the conductive wire 37 and the junction wire 19, a second weld portion 41 is formed only in a region that overlaps the region R2 of the first weld portion 39 within the overlapping region R1 of these wires, as shown in the drawing on the lower side of FIG. 5(b). The region of the second weld portion 41 is denoted by R3.

The step in FIG. 5(b) corresponds to the "second step" in the claims.

The region R2 corresponding to the first weld portion 39 in the axial direction is a region between the forward end (the left end in the drawing on the lower side of FIG. 5(b)) and the rear end (the right end in the drawing on the lower side of FIG. 5(b)) of the first weld portion 39. In the present embodiment, the forward end of the region R2 is the same as the forward end of the conductive wire 37. The rear end of the region R2 is the rearmost position of the welding nugget in a cross-section of the conductive wire 37 taken near its center axis in the axial direction. Even when the forwardmost end of the region R2 is located at a position rearward of the forward end of the conductive wire 37 (the case shown in FIG. 10 described later), the forwardmost end of the region R2 is the forwardmost end of the welding nugget in the cross-section, as in the above.

The phrase "the second weld portion is formed only in a region axially overlapping the first weld portion" is meant to include the case in which the region R3 of the second weld portion 41 extends over the entirety of the region R2 of the first weld portions 39. However, the case in which the region R3 of the second weld portions 41 extends axially outward beyond the region R2 of the first weld portions 39 is excluded. This is because of the following reason. The conductors 33 may, for example, loosen or deform in a portion other than the first weld portion, so that the shape of the conductors 33 is unstable in this portion. Therefore, the junction wire 19 (terminal wire 20) is not in stable contact with the conductors 33. If the second welding is performed on this portion, a welding failure may occur.

The junction wire 19 is harder than the conductive wire 37 and is therefore hardly flattened when the junction wire 19 is pressed and welded between the welding electrodes 202 and 204. Therefore, even when the welding electrodes 202 and 204 used in the first resistance welding are used, and welding is performed at the same position as that in the first resistance welding, the region R3 of the second weld portion 41 extends over the entirety or a portion of the region R2 of the first weld portion 39.

Figure 6A:
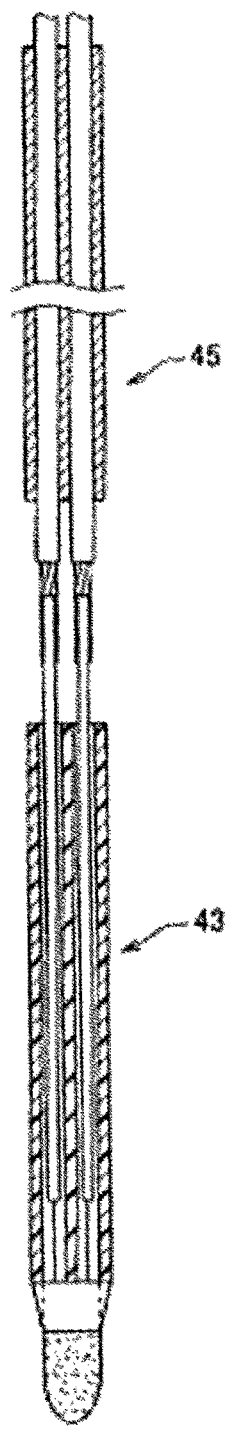
FIG. 6(a) is a cross-sectional view illustrating an internal structure formed by joining and integrating the inner forward end portion and the inner rear end portion, the internal structure being cut in the axial direction.

As shown in FIG. 6(a), as a result of the second resistance welding, the inner forward end portion 43 is connected to the inner rear end portion 45.

Figure 6B:
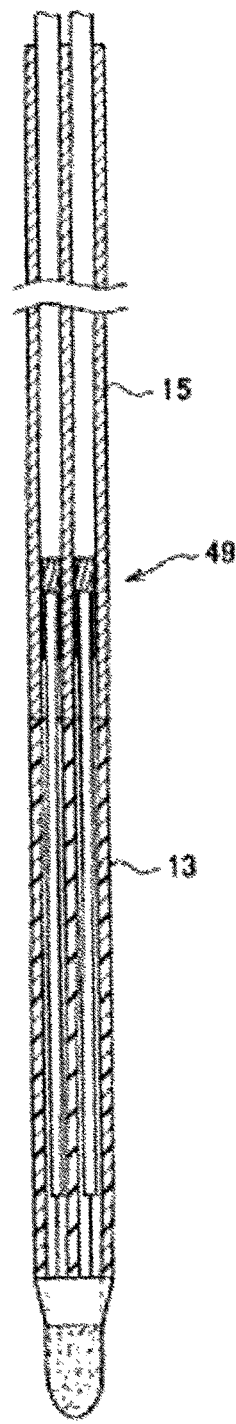
FIG. 6(b) is a cross-sectional view showing the internal structure with an auxiliary ring and an insulator tube abutting against each other, the internal structure being cut in the axial direction.

Next, as shown in FIG. 6(b), the auxiliary ring 15 is moved toward the forward end side (the lower side in FIG. 6(b)) so as to abut against the rear end surface of the insulator tube 13. An internal structure 49 of the temperature sensor 1 is thereby completed.

Figure 7:
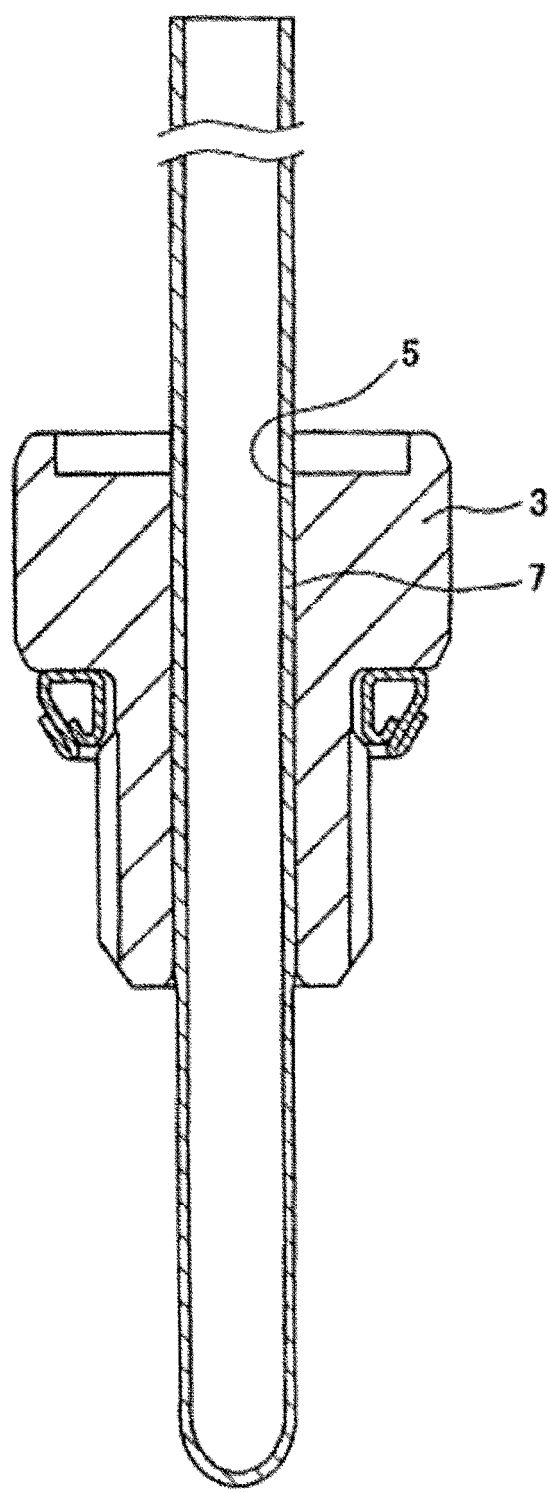
FIG. 7 is a cross-sectional view showing a mounting metal member and a metal pipe brazed thereto, these members being cut in the axial direction.

Separately, as shown in FIG. 7, the metal pipe 7 is brazed to the center hole 5 of the mounting metal member 3 to fix the metal pipe 7 to the mounting metal member 3. The method of fixing the metal pipe 7 to the mounting metal member 3 is not limited to brazing, and the metal pipe 7 may be fixed by press fitting.

Figure 8:
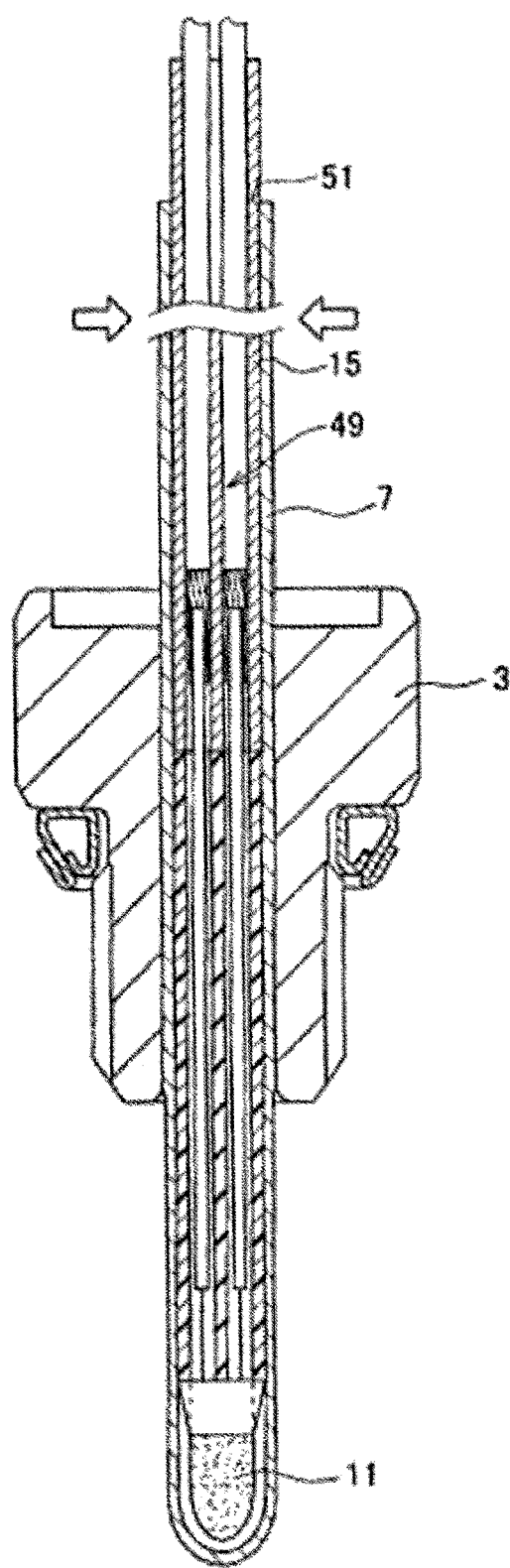
FIG. 8 is a cross-sectional view showing the internal structure contained in the metal pipe, these members being cut in the axial direction.

Next, as shown in FIG. 8, the internal structure 49 described above is fitted into a rear opening 51 (an upper opening in FIG. 8) of the metal pipe 7 fixed to the mounting metal member 3 such that the temperature sensor element 11 is located on the forward end side. Next, the rear end of the metal pipe 7 is crimped externally to integrally fix the internal structure 49 (particularly the auxiliary ring 15) to the metal pipe 7.

(c) In the present embodiment, the configuration described above provides the following effects.

In the present embodiment, as a result of the first welding, a plurality of conductors 33 forming a conductive wire 37 are fusion-bonded and integrated into a flattened shape. Then, the conductive wire 37 composed of the plurality of (integrated) conductors 33 and a junction wire 19 (terminal wire 20) are disposed so as to overlap each other in the axial direction and connected to each other by the second welding.

In this case, since the second welding is performed only in a region overlapping the first weld portion within the axially overlapping region, the second welding is performed at the first weld portion in which the conductors are reliably welded and integrated and their shape is stabilized, so that the occurrence of welding failure caused by, for example, shift of the welding position due to loosening or deformation of the conductors can be suppressed. Therefore, the conductive wire 37 and the terminal wire 20 can be connected more easily and reliably than in the conventional art.

As a result of the first welding, the plurality of fine conductors 33 are integrated, and the terminal wire 20 is connected to the substantially thickened conductive wire 37 (as compared to the individual conductors 33) by the second welding. Therefore, the welding current in the second welding can be set appropriately. Specifically, a welding current suitable for the thickened conductive wire 37 (composed of the plurality of conductors 33) can be set. In this manner, blowout of the conductors 33 during welding (due to an excessively high welding current) can be prevented, and separation of the welded portions (due to an excessively low welding current) can also be prevented.

Preferably, as shown in the drawing on the lower side of FIG. 5(a), the first weld portion 39 is formed by continuously integrating the conductors 33 in the axial direction from their ends, and the axial length LA of the first weld portion 39 is equal to or longer than ½ of the length LB of portions of the plurality of conductors 33 projecting from the insulating cover layers 35. In this case, since the first weld portion 39 is formed by continuously integrating the conductors 33 in the axial direction from their ends, the forward end portion of the conductors is flattened. In addition, the axial length LA of the first weld portion 39 increases, and the length of the region R2 of the first weld portion 39 within which the second welding is performed also increases, so that the junction wire 19 (terminal wire 20) can be reliably disposed on the flattened first weld portion 39. Therefore, the second welding can be performed at the desired position in a more stable and reliable manner.

When the maximum width of the terminal wire 20 is larger than the maximum width of the first weld portion 39, the conductors 33 may easily loosen or deform in a portion other than the first weld portion and change their shape. In this case, a welding failure occurs in the second welding more easily. Therefore, the present invention is more effective when the maximum width of the terminal wire 20 is smaller than the maximum width of the first weld portion 39.

The maximum width of the terminal wire 20 and the maximum width of the first weld portion 39 are the maximum diameter of the terminal wire 20 and the maximum diameter of the first weld portion 39, respectively.

Figure 9A:
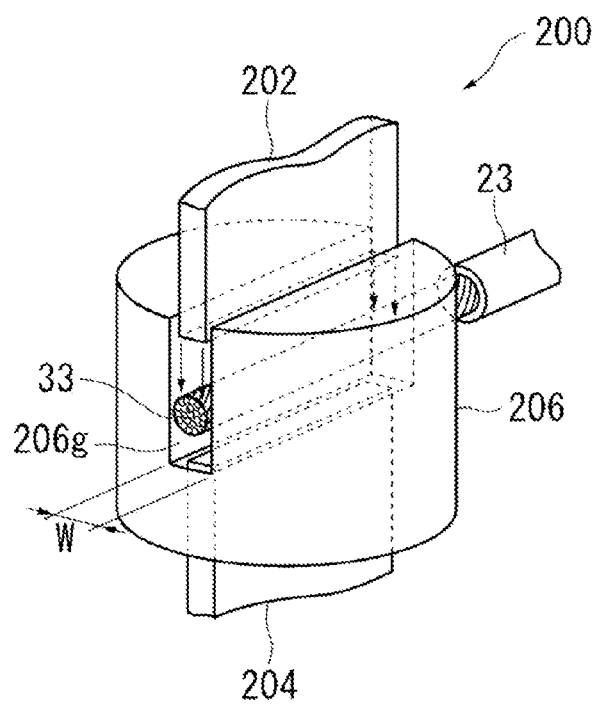
FIG. 9(a) is a perspective view showing a mode in which the first resistance welding is performed with conductors placed in a groove of a guide member.
Figure 9B:
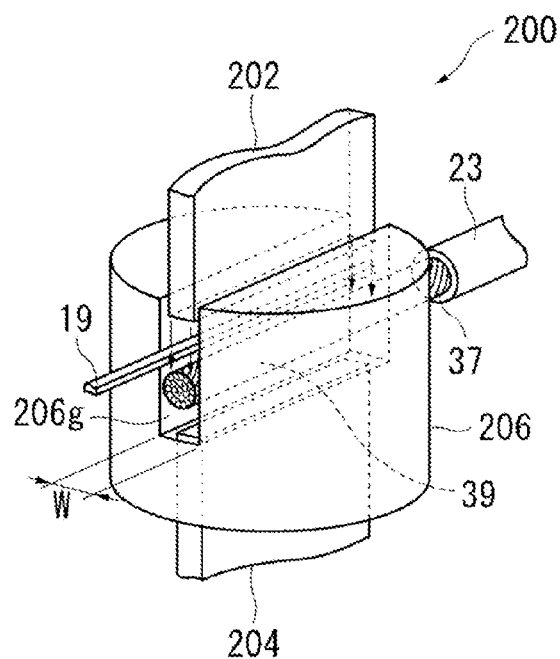
FIG. 9(b) is a perspective view showing the mode in which the second resistance welding is performed with conductors placed in the groove of the guide member.

Referring next to FIGS. 9(a) and 9(b), a mode in which first and second steps are performed using the guide member will be described.

As shown in FIG. 9(a), the welding apparatus 200 includes the welding electrodes 202 and 204 and the guide member 206. The guide member 206 has a substantially circular columnar shape, and a straight groove 206g is formed in the guide member 206. The straight groove 206g passes through the center of the guide member 206, extends radially outward. The straight groove 206g is recess extending downward from the upper surface of the guide member 206. The rectangular upper surface of the welding electrode 204 appears on the bottom surface of the groove 206g. The rectangular welding electrode 202 is inserted into the groove 206g from the upper side of the groove 206g, and the lower surface of the welding electrode 202 faces the upper surface of the welding electrode 204.

The width W of the groove 206g is slightly larger than the overall diameter of conductors 33 of a lead wire 23, and the conductors 33 can be inserted into the groove 206g.

The conductors 33 are placed inside the groove 206g. Then, the welding electrode 202 is lowered within the groove 206g, and resistance welding is performed while the conductors 33 are pressed between the welding electrodes 202 and 204. In this manner, a first weld portion 39 can be formed while the groove 206g serving as a guide restrains the conductors 33 from spreading in their width direction.

Since the groove 206g can restrain the conductors 33 from loosening or excessively spreading when the conductors 33 are pressed, the width of the first weld portion 39 is constant and close to the width W of the groove 206g, so that the first weld portion 39 obtained has a uniform shape. Therefore, a terminal wire 20 can be stably placed on the first weld portion 39, and the second welding can be performed in an easy and reliable manner.

Preferably, as shown in FIG. 9(b), the junction wire 19 (terminal wire 20) is placed on the conductive wire 37 having the first weld portion 39 formed within the groove 206g in FIG. 9(a) such that these wires overlap each other. Then, the welding electrode 202 is lowered within the groove 206g, and the second welding (resistance welding) is performed while the overlapping region of the conductive wire 37 and the junction wire 19 (terminal wire 20) is pressed between the welding electrodes 202 and 204.

In this manner, a second weld portion can be formed while the groove 206g serving as a guide restrains the junction wire 19 (terminal wire 20) from coming off the conductive wire 37.

The present invention can be embodied with its design structure and configuration appropriately modified, so long as the modifications do not go beyond the scope of the present invention.

For example, the present invention is not limited to the case in which a terminal wire of a temperature sensor is welded to a conductive wire (composed of a plurality of conductors) and is applicable to welding of a terminal wire of any of various sensors (e.g., an oxygen sensor) to the conductive wire.

The relative axial positions of the overlapping region, the first weld portion, and the second weld portion are not limited to those described above.

Figure 10:
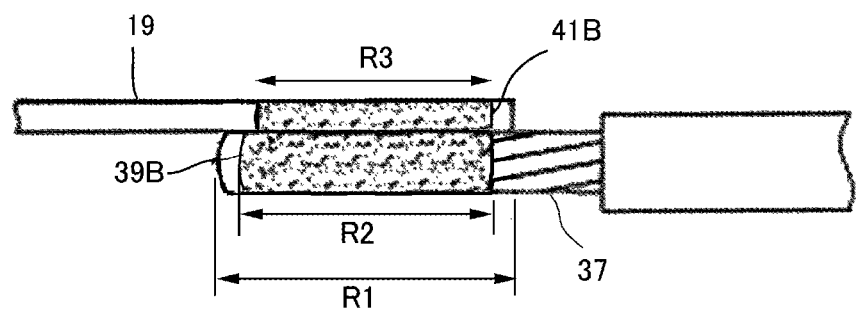
FIG. 10 is an enlarged cross-sectional view showing a modification of a joint portion between a lead wire and a junction wire.

For example, as shown in FIG. 10, the forwardmost end of the region R2 corresponding to a first weld portion 39B may be located axially rearward of the forward end of the conductive wire 37. The axial position of the rearmost end of the region R2 may be the same as the axial position of the rearmost end of the region R3 of a second weld portion 41B.

Figure 11:
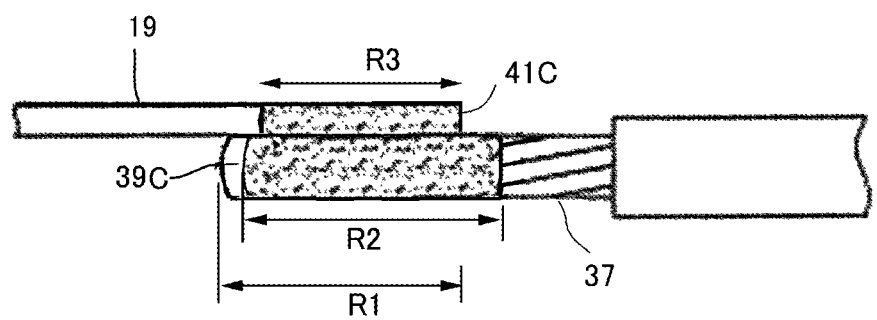
FIG. 11 is an enlarged cross-sectional view showing another modification of the joint portion between the lead wire and the junction wire.

As shown in FIG. 11, one end of the overlapping region R1 may be located within the region R2 corresponding to a first weld portion 39C.

In the above-described embodiment, the terminal wires are strip-shaped plate members. However, the cross section of each terminal wire may have the shape of a polygon having n sides (n≥5), a circular shape, or an elliptical shape. In the case where the cross section of each terminal wire has a circular shape which is one of the above-mentioned shapes, the terminal wire easily slips off the initial placement position. However, slipping off of the terminal wire can be restrained by performing the second welding on the first weld portion having a stable shape as in the case of the present invention.

DESCRIPTION OF REFERENCE NUMERALS

1: temperature sensor (sensor)
11: temperature sensor element (sensor element)
19: junction wire (terminal wire)
20: terminal wire
29: temperature-sensitive portion (sensing portion)
33: conductor
37: conductive wire
39, 39B, 39C: first weld portion
41, 41B, 41C: second weld portion
206: guide member
206g: groove of guide member
R1: overlapping region
LA: axial length of first weld portion
LB: length of axially projecting portions of conductors

What is claimed is:

1. A sensor comprising:
a sensor element including a sensing portion and a terminal wire extending from the sensing portion, the sensing portion having an electrical characteristic that changes in accordance with a change in an atmosphere around the sensing portion; and
a conductive wire for communicating an electrical signal from the sensor element, the conductive wire including a plurality of conductors twisted together and having ends in a longitudinal direction of the sensor,
the terminal wire and the conductive wire arranged in the longitudinal direction and connected to each other by welding,
wherein,
a portion of the conductive wire extending in the longitudinal direction is welded to integrate the plurality of conductors therein and to form a first weld portion,
the first weld portion is formed by continuously integrating the plurality of conductors from their ends in the longitudinal direction,
and
the terminal wire and the conductive wire are connected to each other through a second weld portion, the second weld portion formed only in a region longitudinally overlapping the first weld portion.

2. A sensor according to claim 1, wherein a longitudinal length of the first weld portion is equal to or more than ½ of a length of portions of the plurality of conductors projecting from an insulating cover layer covering the plurality of conductors.

3. A sensor according to claim 1, wherein a maximum width of the terminal wire is smaller than a maximum width of the first weld portion.

4. A method of producing a sensor comprising a sensor element including a sensing portion and a terminal wire extending from the sensing portion, the sensing portion having an electrical characteristic that changes in accordance with a change in an atmosphere around the sensing portion, and a conductive wire for communicating an electrical signal from the sensor element, the conductive wire including a plurality of conductors twisted together, the terminal wire and the conductive wire arranged in a longitudinal direction of the sensor and connected to each other by welding,
the method comprising:
a first step of melting by first welding a portion of the conductive wire in the longitudinal direction to integrate the plurality of conductors therein and to form a first weld portion by placing the plurality of conductors in a groove of a guide member, the groove having a prescribed width, and forming the first weld portion while the conductors are restrained from spreading in a width direction thereof; and
a second step of placing the terminal wire on the conductive wire such that the terminal wire and the conductive wire overlap each other in the longitudinal direction to form an overlapping region extending over at least part of the first weld portion, and then forming a second weld portion by second welding the terminal wire to the conductive wire only in a region overlapping the first weld portion and within the overlapping region.

5. The method of producing a sensor according to claim 4, wherein the second step is performed in a state in which the overlapping region is formed by placing the terminal wire on the plurality of conductors disposed in the groove of the guide member.

* * * * *